Dec. 16, 1930. E. E. GREVE 1,785,255
CROWN BLOCK PULLEY CONSTRUCTION
Filed April 6, 1927

Inventor
E. E. Greve
by W. G. Doolittle
Attorney

Patented Dec. 16, 1930

1,785,255

UNITED STATES PATENT OFFICE

EDGAR E. GREVE, OF BELLEVUE, PENNSYLVANIA, ASSIGNOR, BY MESNE ASSIGNMENTS, TO OIL WELL SUPPLY COMPANY, OF PITTSBURGH, PENNSYLVANIA, A CORPORATION OF NEW JERSEY

CROWN-BLOCK-PULLEY CONSTRUCTION

Application filed April 6, 1927. Serial No. 181,593

My invention relates to improvements in crown block pulley constructions particularly designed for oil and gas well drilling rigs.

Among the objects of the present invention are, to provide a simple and efficient pulley construction of the character specified whereby the sheave bearings may be adjusted by simple means and without removing the sheave from its shaft; to provide a crown pulley construction including shiftable shaft bearings functioning to adjust the sheave bearings and providing closure means for the bore of the sheave hub; and to provide sheave bearings operable in a lubricating bath contained within the hub of the sheave and of a character to prevent a lateral movement of the sheave on its shaft.

Figure 1:
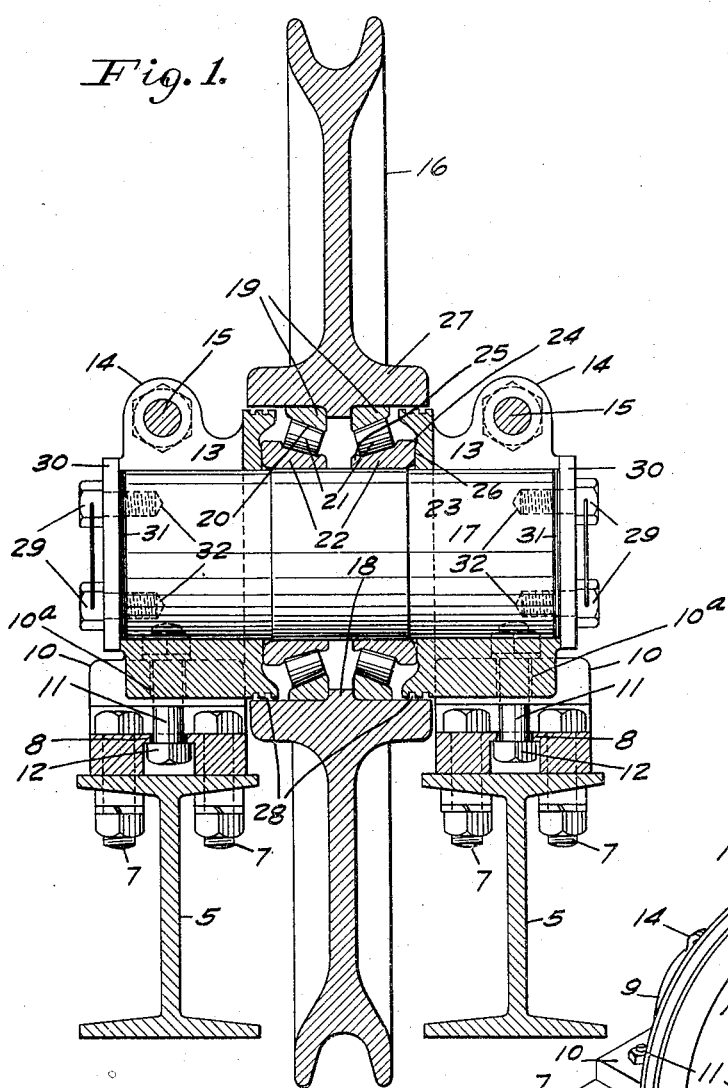
Figure 2:
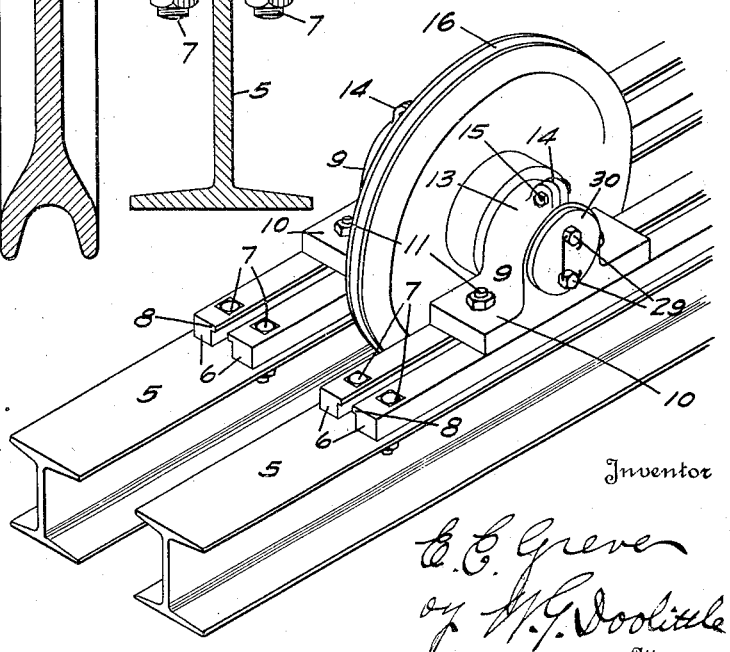

In the accompanying drawings which illustrate an application of my invention:

Fig. 1 is a central vertical sectional view of a crown block pulley construction embodying my invention; and Fig. 2, a perspective view.

Referring to the drawings, 5 designates I-beams constituting parts of the crown block construction, 6 slide rails secured to members 5 by means of bolts 7. Slide rails 6 are spaced apart on the I-beams 5 and are provided with inwardly projecting flanged portions 8.

Mounted on the slide rails 6 I provide movable bearing members 9; these bearings as illustrated and as preferred include a base portion 10 designed to be adjustably connected with the rails 6 by means of headed bolts 11 passed through the base portions and having a portion entered in the space between the slide rails 6 with the head 12 of said bolt 11 arranged in contact with the flanged portions 8 of the said rails. In addition to the base portion the bearings 9 each include a split shaft receiving portion 13 having apertured lugs 14 thereon. 15 designate bolt and nut means for clamping the split portions together.

The bearing members 9 are designed to be shifted laterally with respect to the I-beams 5 and the rails 6 and therefore the distance or space between the flanged portions 8 of rails 6 is made sufficiently great to receive the bolts 11 and to permit of a horizontal or an inward or outward movement of the bolts 11 between the flanged portions 8. The diameters of the holes 10a formed in the base portions 10 and through which the bolts 11 pass may be sufficiently large to permit of a cross movement of the bolts therein.

The sheave or pulley is designated by the numeral 16 and, as shown, it is loosely mounted on a non-rotatable shaft 17, the latter having its bearings in the bearing members 9. Sheave 16 is provided with an annular inwardly projecting stop member 18 designed to constitute a stop to limit the inward movement of outer sets of bearing races 19. Races 19 have inclined faces 20 designed to cooperate with conical roller bearings 21 interposed between the races 19 and a second set of bearing races 22. Bearing races or members 22 are each formed with an inclined roller contacting face 23 disposed between flanged portions 24 and 25; and the said flanged portions 24 are arranged in contact with faces 26 of the shaft bearings 9.

It will be noted that by the employment of the conical bearings 21 and the bearing races 19 and 22 arranged and cooperating as shown, adjustment may be effected to prevent lateral movement of the sheave on its shaft and that independent side thrust bearings are not necessary.

The inner ends of the bearing members 9, or the portions 13 thereof, are designed to be entered in the bore of the hub 27 of the sheave and constitute closures therefor to retain a lubricating bath within the hub of the sheave and in which the roller bearings operate. 28 designate packings interposed between the inner wall of the hub and those portions of the bearings 9 that project thereinto.

Located at each end of shaft 17 and adjustably secured thereto by means of headed bolts 29 I provide adjusting plate members 30. Interposed between the ends of the shaft 17 and the said adjusting plates 30 I have shown several very thin disks or shims 31.

It will be noted that the conical bearings may be adjusted without removing the sheave from its shaft or without the removal of other parts, with the exception of the shims 31. The desired adjustment may be effected by moving the adjusting plate member 30 by means of the operating threaded bolts 29 which extend through the said plates and into threaded recesses 32 formed in the ends of the shaft 17. A movement of the plates toward the sheave bearings will impart a corresponding movement to the shaft bearings 9 and, as portions of bearings 9 are arranged in contact with the conical bearing races and the stop member 18 in contact with races 19, the proper adjustment is made.

By entering the inner ends of portions 13 of the shaft bearings 9 into the hub of the sheave and the employment of the packings as shown, I provide an oil-tight connection and thus avoid employing the usual separate closure plates for maintaining the lubricating bath within the hub of the sheave.

What I claim is:

1. A crown block pulley including a relatively fixed shaft, a sheave, conical anti-friction bearings for the sheave, adjustable shaft bearings adapted to be anchored on supporting means and jointly with the sheave enclosing the anti-friction bearings and arranged for movement on the shaft for adjusting the sheave bearings, and means for moving the shaft bearings on the shaft.

2. A crown block pulley including a relatively fixed shaft, a sheave, conical anti-friction bearings for the sheave, adjustable shaft bearings having portions thereof entered in the hub of the sheave and jointly with the latter adapted to be anchored on supporting means and jointly with the latter enclosing the anti-friction bearings and arranged for movement on the shaft for adjusting the sheave bearings, and means for moving the shaft bearings on the shaft.

3. A crown block pulley including a relatively fixed shaft, a sheave, anti-friction bearings between the shaft and the hub of the sheave, non-rotatable adjustable shaft bearings having portions thereof entered in the hub of the sheave and jointly with the latter and arranged for movement on the shaft for adjusting the sheave bearings, supporting means anchoring said shaft bearings, and means for moving the said shaft bearings comprising a plate adjustably secured to an end of the shaft and means for moving the adjusting plate.

4. A crown block pulley including a relatively fixed shaft, a sheave having a hub portion provided with an inwardly projecting stop-member, anti-friction bearings between the shaft and the hub portion of the sheave arranged on opposite sides of the stop-member, adjustable shaft bearings having portions thereof entered in the hub of the sheave and jointly with the latter and arranged for movement on the shaft for adjusting the sheave bearings, supporting means mounting said shaft bearings, and means for moving the said shaft bearings.

5. A crown block pulley including a relatively fixed shaft, a sheave, two conical anti-friction bearing devices between the shaft and sheave, non-rotatable bearings adapted to be anchored on supporting means, said bearings being arranged in contact with the respective bearing devices and movable longitudinally of the shaft to adjust said devices, said bearings being split, and means on the bearings to clamp them rigidly to the shaft.

6. A crown block pulley including a relatively fixed shaft, a sheave, two non-rotatable bearing devices between the shaft and sheave each comprising races and conical anti-friction bearing members between them, bearings in contact with a race of the respective bearing devices movable longitudinally of the shaft to adjust the engaged races, supporting means anchoring said bearing devices, the other races being relatively stationary with respect to said engaged races.

7. A crown block pulley including a relatively fixed shaft, a sheave, two bearing devices about the shaft located in the hub of the sheave, each device comprising races and conical anti-friction bearing members between them, non-rotatable bearings closing the ends of said hub and disposed in contact with a race of the respective bearing devices, supporting means anchoring said bearings, means mounted on the shaft operable against said bearings to adjust them longitudinally of the shaft and thereby adjust the engaged races, the other races being relatively stationary with respect to said engaged races, said bearings being split, and means carried by the bearings operable to clamp them rigidly on the shaft.

In testimony whereof I affix my signature.

EDGAR E. GREVE.